Oct. 6, 1970   G. L. ANDERSON   3,532,237
AUGER SYSTEM FOR DUMP BOXES
Filed Sept. 3, 1968                                      2 Sheets-Sheet 1
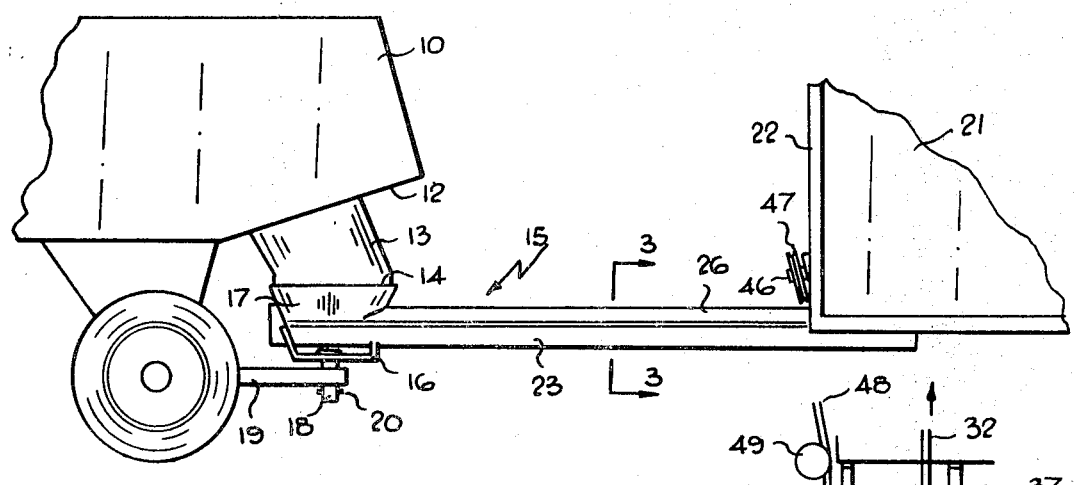
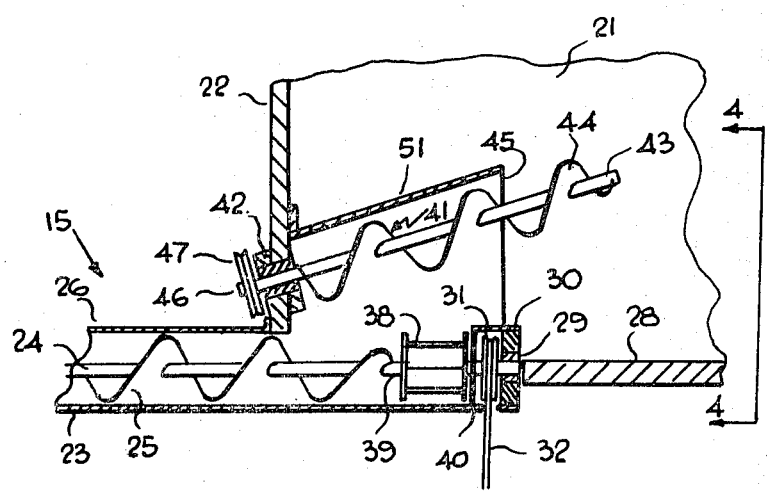
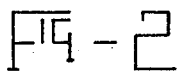
INVENTOR
GORDON L. ANDERSON
BY
Kent + Ade
ATTORNEY INVENTOR
GORDON L. ANDERSON
BY
Kent & Ade
ATTORNEY

United States Patent Office 3,532,237
Patented Oct. 6, 1970

3,532,237
AUGER SYSTEM FOR DUMP BOXES
Gordon L. Anderson, Raymond, Alberta, Canada, assignor to Flexa-Hopper (1968) Ltd., Welling, Alberta, Canada
Filed Sept. 3, 1968, Ser. No. 757,071
Int. Cl. B60p 1/42
U.S. Cl. 214—519          12 Claims

ABSTRACT OF THE DISCLOSURE

An auger system for dump boxes consisting of a main auger intake to the box with beaters on the one end to fluff the chaff and a short open, upwardly and inwardly inclining distributing auger immediately above the discharge of said main auger to distribute the chaff rearwardly and clear of the discharge of the main auger.

---

This invention relates to new and useful improvements in auger systems for dump boxes and is designed primarily for transferring chaff from the discharge of a combine to the interior of a chaff dump box.

One of the features of the present device is that the auger tube is connected by one end thereof to the rear end of the combine and by the other end thereof to the dump box so that the auger tube acts as a draft arm.

This auger tube is readily detachable from the combine when desired, it being merely necessary to remove one pin and then lift the assembly clear.

This facilitates attaching and detaching dump boxes to combines and results in a saving of considerable time.

Furthermore the pivot pin mounting the end of the auger tube to the combine is vertically situated immediately below the intake of the tube so that even when the combine is turning corners, the intake remains below the discharge end of the combine so thta all chaff is collected and transferred by the auger to the box.

Another important object of the invention is to provide a distribution auger within the box situated immediately above the discharge end of the main auger and inclining upwardly and inwardly therefrom thus keeping chaff clear of the discharge end and preventing piling of chaff occurring around the discharge end.

When an auger system is used to transfer chaff to a box, the nature of the chaff results in the chaff piling around the intake and only being moved by the ingress of further chaff. This results in inefficiency of the auger operation and occasionally jamming of the auger system.

By providing a distribution auger running at a lower speed than the main auger, the discharge end of the main auger is kept clear.

Beaters may be provided on the end of the auger fluffing the chaff and once again assisting in keeping the discharge end clear.

The present system is economical in manufacture, simple in operation, and otherwise well suited to the purpose for which it is designed.

With the foregoing considerations in view, and such other objects, purposes or advantages as may become herein particularly exemplified in one or more specific cation, the present invention consists of the invenitve concept exhibited in the method, process, constructon, arrangement of parts, or new use of any of the foregoing herein particularly exemplified in one more more specific embodiments of such concept, reference being had to the accompanying figures in which:

FIG. 1 is a side elevation showing the rear end of a combine and the front end of a chaff box with my auger inbetween.

FIG. 2 is an enlarged fragmentary view of the rear end of the chaff box showing the intake of the main auger and the distributing auger.

In the drawings like characters of reference indicate corresponding parts in the different figures.

Figure 3:
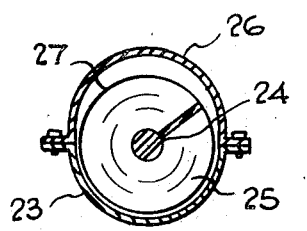
FIG. 3 is a section through the main auger along the line 3—3 of FIG. 1.
Figure 4:
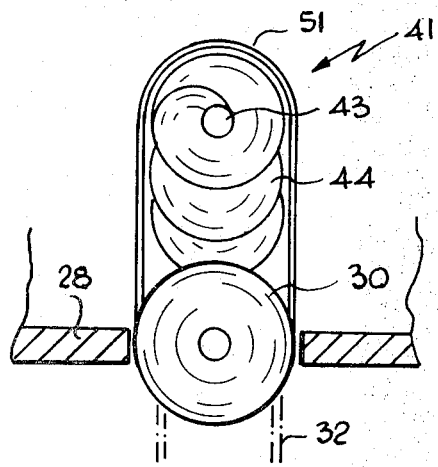
FIG. 4 is a view substantially along the line 4—4 of FIG. 2.
Figure 5:
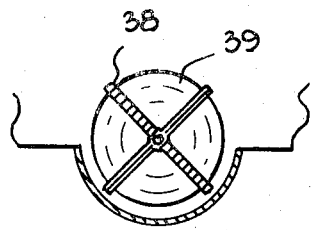
FIG. 5 is a sectional view substantially along the line 5—5 of FIG. 6.
Figure 6:
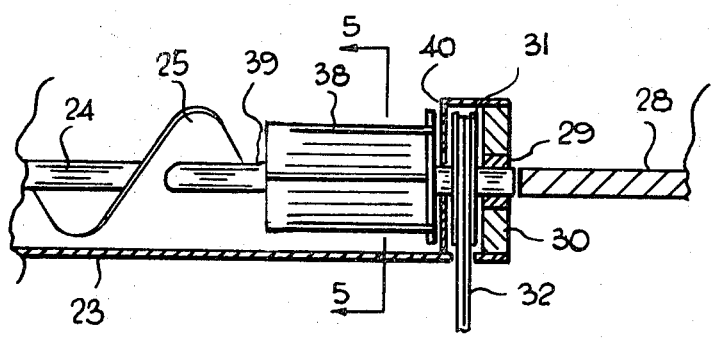
FIG. 6 is an enlarged fragmentary side elevation showing the inner end of the main discharge end of the auger.

Proceeding therefore to describe the invention in detail, reference character 10 illustrates the rear end of a combine 11, 12 indicating the chaff discharge portion. A collector funnel 13 collects the chaff and directs it downwardly into the circular intake funnel 14 of a main auger assembly collectively designated 15. A bracket 16 is secured to the intake end 17 of this main auger and a vertical pivot pin 18 is secured to the bracket and extends downwardly therefrom. It should be noted that this pivot pin is immediately below the center of the intake 14 of the auger tube.

A hitch 19 extends rearwardly of the combine and pivot pin 18 engages the hitch and is held in position by means of cotter pin 20. To remove the assembly, it is merely necessary to withdraw cotter pin 20 whereupon the end 17 of the auger 15 may be lifted upwardly together with the pivot pin 18 and disengaged from the combine so that the auger assembly acts as a draft bar between the combine and the chaff box.

This main auger assembly 15 extends rearwardly to a chaff box 21 and is secured to the front wall 22 thereof.

Within the main auger assembly tube 23 is an auger assembly consisting to an auger shaft 24 and auger flight 25 secured thereto. The auger tube 23 is shown in cross section in FIG. 3 and is substantially circular where it encloses the auger flight 25. However, the upper portion 26 is domed or spaced from the upper periphery 27 of the auger flight and this clearance prevents the relatively fine chaff from jamming in the tube, particularly if an excess of heads and/or stalks is also being augered at the same time.

The upper portion 26 of the auger tube 23 terminates at the front wall 22 but the auger assembly consisting of the base of the tube, the flight 25 and shaft 24 extend inwardly parallel to the floor 28 thus forming what I define as a discharge section. The shaft 24 is supported within a bearing 29 held within a cover 30 secured to the floor. Secured to the shaft within the cover 20, is a pulley 31 and an aperture within the floor permits belt 32 to extend around the pulley and around a further pulley 33 on a counter shaft 34 below the floor. Reference character 25 shows schematically a source of power which may take the form of an air cooled gasoline engine, an electric motor, or a connection to the combine. This drives the counter shaft 34 via belt 36 and pulley 37.

The rotation of the auger assembly 24 and 25 is such that chaff is moved from the intake 14 into the box 21 and is discharged by the auger flight within the box.

A plurality of beater blades 38 are secured to the shaft beyond the end 39 of the auger flight and a disc 40 is secured to the end of the shaft and the end of the beaters to prevent chaff from entering the cover. The beaters fluff the chaff being discharged by the discharge end and keep this discharge end relatively clear of chaff and prevent packing from occurring.

A distribution auger assembly collectively designated 41 is situated above the discharge end of the main auger within the box 21 in the same vertical plane but spaced upwardly therefrom. This distribution auger assembly inclines or diverges upwardly and inwardly from the discharge end of the main auger as clearly shown in FIG. 2. The distribution auger assembly is cantilever supported upon the front wall 22 by means of inner and outer bearing assembies 42 and comprises an auger shaft 43 upon which an open auger flight 44 is secured. This distributing auger assembly extends well beyond the inner end 45 of the main auger.

The outer end 46 of the shaft 43 is provided with a drive pulley 47 and a belt 48 extends around this, around guiding pulley 49 to a pulley 50 secured to the counter shaft 34 and is driven thereby. The size of the pulleys 50 and 47 are such that the distribution auger assembly 41 rotates slower than the main auger 15 thus clearing the chaff rearwardly within the box as soon as it is augered into the box.

A shroud 51 surrounds the major portion of the distribution auger and the entire discharge end of the main auger being secured to the upper edges of the tube portion 23 within the box. This ensures that chaff is cleared from the auger assemblies. With normal transfer device from combines to dump boxes, any grain passing over the sieves is blown with the chaff into the wagon and is deposited in roughly the same place when the load is dumped into the field. This is dangerous if animals are feeding from this.

The present system ensures even mixing of any grain or seeds which inadvertently pass over the sieve with the chaff, due primarily to the beaters 38 and the distribution auger assembly 41.

Various modifications can be made within the scope of the inventive concept disclosed. Accordingly, it is intended that what is described herein should not be regarded as illustrative of such concept and not for the purpose of limiting protection to any particular embodiment thereof, but that only such limitations should be placed upon the scope of protection to which the inventor hereof is entitled as justice dictates.

What is claimed to be the present invention is:

1. An auger system for transferring chaff from combines and the like to an associated chaff dump box comprising in combination a main auger assembly, said assembly including an auger flight and shaft therefor, a tube for said main auger assembly connected by one end thereof to one wall of said chaff box, said auger assembly extending into said box and forming a discharge end within said box, a distribution auger in said box immediately above and spaced from said discharge end, said distribution auger diverging upwardly from said discharge end and extending beyond the end of said discharge end.

2. The device according to claim 1 in which said distribution auger is journalled by one end thereof to said one wall of said box, said distribution auger lying in the same vertical plane as said discharge end.

3. The device according to claim 1 which includes a shroud covering said discharge end and the major portion of said distribution auger.

4. The device according to claim 2 which includes a shroud covering said discharge end and the major portion of said distribution auger.

5. The device according to claim 1 which includes a bearing support upon the innermost end of said discharge end, a cover for said support, a belt pulley under said cover, and means operatively connection said belt pulley to a source of power.

6. The device according to claim 2 which includes a bearing support upon the innermost end of said discharge end, a cover for said support, a belt pulley under said cover, and means operatively connecting said belt pulley to a source of power.

7. The device according to claim 3 which includes a bearing support upon the innermost end of said discharge end, a cover for said support, a belt pulley under said cover, and means operatively connecting said belt pulley to a source of power.

8. The device according to claim 4 which includes a bearing support upon the innermost end of said discharge end, a cover for said support, a belt pulley under said cover, and means operatively connecting said belt pulley to a source of power.

9. The device according to claim 5 which includes a plurality of beater blades on the shaft of said auger assembly extending into said box, said beater blades being situated beyond the end of the flight of said auger, and a barrier disc between said beater blades and said cover.

10. The device according to claim 6 which includes a plurality of beater blades on the shaft of said auger assembly extending into said box, said beater blades being situated beyond the end of the flight of said auger, and a barrier disc between said beater blades and said cover.

11. The device according to claim 7 which includes a plurality of beater blades on the shaft of said auger assembly extending into said box, said beater blades being situated beyond the end of the flight of said auger, and a barrier disc between said beater blades and said cover.

12. The device according to claim 8 which includes a plurality of beater blades on the shaft of said auger assembly extending into said box, said beater blades being situated beyond the end of the flight of said auger, and a barrier disc between said beater blades and said cover.

References Cited

FOREIGN PATENTS 996,682   9/1951   France.

OTHER REFERENCES

Schwab: German Printed Application 1,188,507, March 1965.

ROBERT G. SHERIDAN, Primary Examiner

U.S. Cl. X.R.

214—41, 83.32